United States Patent Office 3,175,215
Patented Mar. 23, 1965

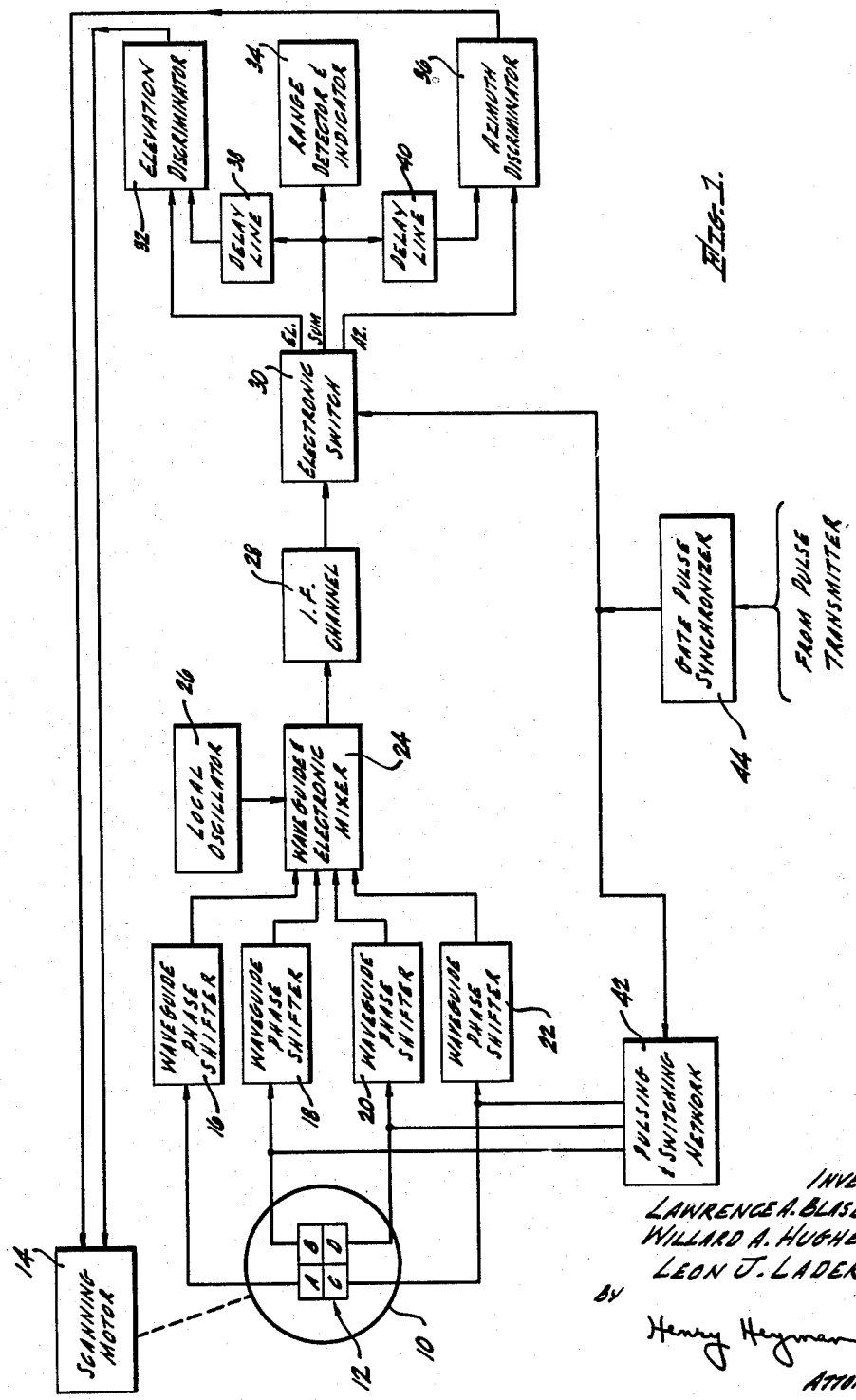

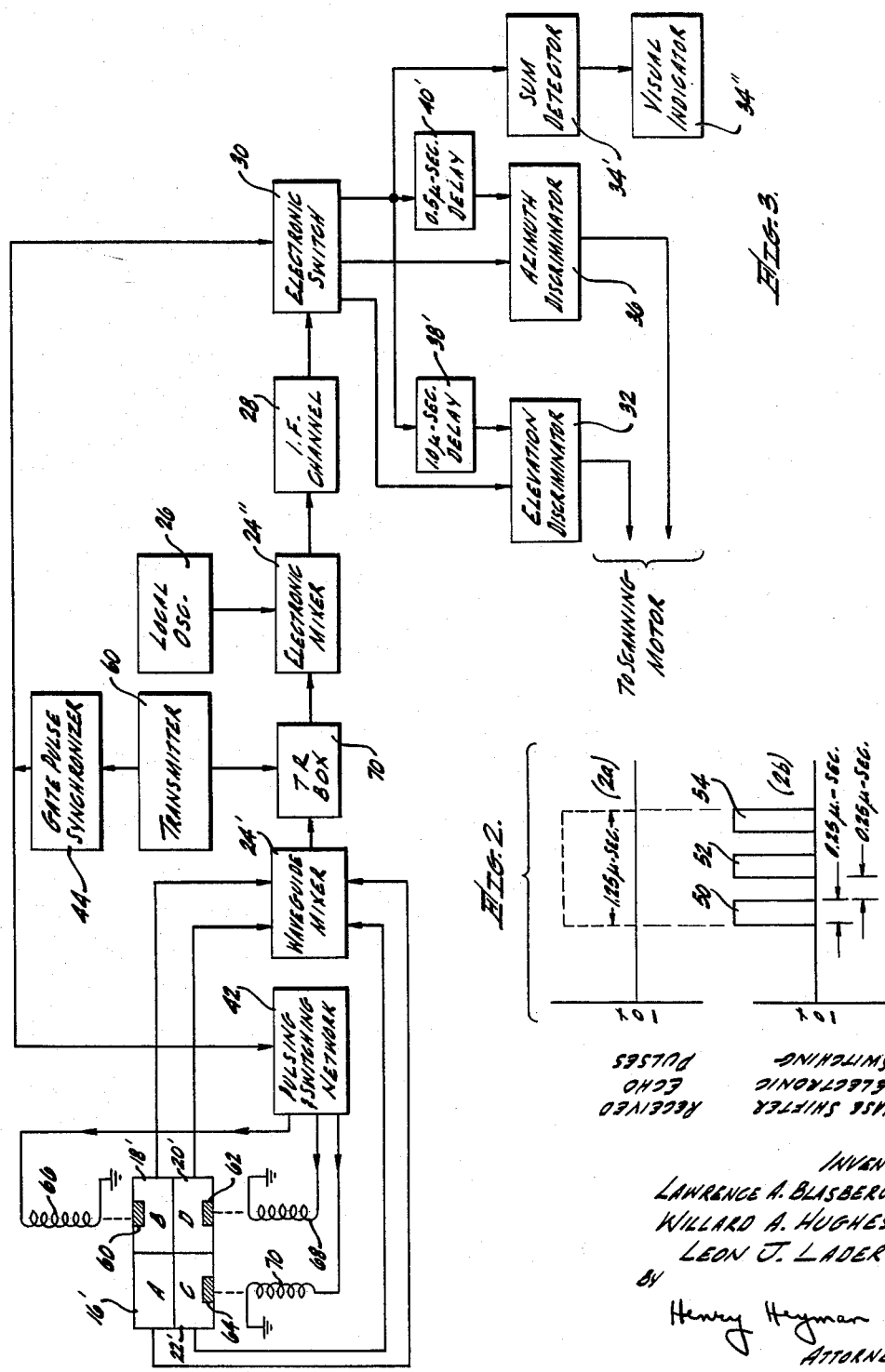

3,175,215
SINGLE CHANNEL MONOPULSE RADAR
SYSTEM
Lawrence A. Blasberg, Willard A. Hughes, and Leon J. Lader, Los Angeles, Calif., assignors to Hughes Aircraft Company, Culver City, Calif., a corporation of Delaware
Filed Sept. 8, 1954, Ser. No. 454,775
5 Claims. (Cl. 343—16)

This invention relates generally to target tracking radar systems, and more particularly to a monopulse radar system employing only one receiver channel to obtain complete target positional information during each pulse reflected from the target.

In conventional monopulse radar systems, pulses are transmitted toward a target through an array of waveguide apertures which are disposed about the axis or center line of an antenna reflector. Horizontally aligned apertures are connected to an azimuth receiving channel, vertically aligned apertures are connected to an elevation receiver, and all apertures are connected to a sum or range receiver channel. The echo pulses reflected from the target are received through the apertures to apply signals to the azimuth and elevation receiver channels whose respective magnitudes represent the degree of angular displacement of the target in azimuth and in elevation with respect to the center of the reflector. The sum signal is applied to both the azimuth and the elevation receiver channels to provide a phase reference. Signals of one polarity are developed in the azimuth and elevation receiver channels when the respective azimuth and elevation error signals are in phase with the sum signal, and signals of opposite polarity are developed in such channels when the respective azimuth and elevation error signals are 180° out of phase with the sum signal. The polarity of the signals from the azimuth receiver channel indicates whether the angular displacement of the target is to the right or left of the center of the reflector, and the polarity of the signals from the elevation receiver channel indicates whether the target is above or below the center of the reflector. These error signals may then be utilized to automatically track the target, i.e., to manipulate the reflector so that the error signals will be reduced.

An important disadvantage of prior art monopulse receiver systems is that slight differences in circuit components in the azimuth and elevation receiver channels, such as may be effected by differences in tube characteristics, cause the sum or reference signal in the azimuth receiver channel to be out of phase with the reference signal through the elevation receiver channel. This necessitates the use of phase equalization circuits to prevent false error signals being developed in the azimuth and elevation receiver channels. Further, where broad band operation of the system is desired, the necessity for phase equalization restricts the band over which conventional monopulse receiver systems can be effective, because changes in frequency of the transmitted pulses requires phase equalization circuits with response times of the order of magnitude of the time constant of the servo loop which changes the frequency of the transmitter. In practice, such phase equalization can not be designed to permit relatively broad band operation of the system.

A further and obvious disadvantage of prior art monopulse receiver systems is that presented by the use of three separate receiver channels and their power, weight and space requirements.

It is an object of this invention to provide a monopulse type radar receiver system in which complete information of target position is obtained through a single receiver channel during each pulse received from a target.

It is another object of this invention to provide a monopulse radar system having only one receiver channel to obtain complete target positional information during each pulse received from a target, which does not require the use of phase equalization circuits and other additional control arrangements necessary for use in conventional monopulse systems.

It is a further object of this invention to provide a monopulse radar system which requires the use of only one receiver channel to obtain the information which in prior art systems requires the use of three receiver channels, which utilizes a minimum number of component parts and has smaller space and weight requirements than prior art monopulse radar systems.

The novel features which are believed to be characteristic of the invention, both as to its organization and method of operation, together with further objects and advantages thereof, will be better understood from the following description considered in connection with the accompanying drawings which are made part of this specification. In the drawing, FIG. 1 is a block diagram of a single channel receiver for use in a monopulse radar system, in accordance with this invention;

FIG. 2 presents wave forms of transmitted and received signal pulses to aid in explaining the operation of the system of FIG. 1; and FIG. 3 is a block diagram showing certain portions of the system of FIG. 1 in greater detail.

In accordance with the present invention, a received echo signal is selectively shifted in phase to obtain three distinct pulses, i.e., each received echo pulse is time-multiplexed to develop three spaced pulses. The short pulses represent the sum, azimuth, and elevation signals received during the respective portions of the received echo pulses and are switched respectively to sum, azimuth, and elevation detecting means. The respective detecting means develop signals representative of range, azimuth error and elevation error, which signals can be utilized in a conventional manner, as for target tracking and display purposes.

Referring to FIG. 1, a single channel monopulse receiver in accordance with this invention utilizes an antenna reflector 10 which supports an array of waveguides, generally indicated at 12 as four rectangular waveguide sections. The apertures A, B, C, and D of the waveguides are arrayed about the center of reflector 10, with apertures A and B horizontally aligned above the center of reflector 10 and apertures C and D horizontally aligned below the center. Apertures A and C are vertically aligned to the left of the center of the reflector, and apertures B and D are vertically aligned to the right of the center of the reflector. A scanning motor 14 is mechanically linked to reflector 10 to cause reflector 10 to be manipulated.

Apertures A, B, C, and D are coupled to respective waveguide phase shifters 16, 18, 20, and 22. The output of each phase shifter is coupled to a waveguide and electronic mixer 24. Signals in mixer 24 combine with the output of a local oscillator 26 so that signals of a predetermined intermediate frequency are developed in the output of mixer 24. The intermediate frequency signals are applied through an intermediate frequency (IF) channel 28 to an electronic switch 30. Switch 30 has respective elevation, sum and azimuth output connections to an elevation discriminator 32, a range detector and indicator 34, and an azimuth discriminator 36. Respective delay lines 38 and 40 are connected from the sum output connection to the elevation and azimuth discriminators 32, 36. The outputs of discriminators 32 and 36 are connected to the scanning motor 14. A pulsing and switch network 42 has respective output connections to three of the phase shifters 18, 20, and 22, to selectively control their operation. The operations of both pulsing and switch network 42 and switch 30 are controlled by the output of a gate pulse synchronizer 44 which is coupled to a pulse transmitter (not shown).

The operation of the above described system will now be described with reference to FIG. 2. During each received echo pulse (FIG. 2a), gate pulse synchronizer 44 is adapted to apply three spaced control pulses 50, 52, and 54 (FIG. 2b) to the pulsing and switch network 42 and electronic switch 30. The pulsing and switch network 42 is adapted to develop no output signal during the occurrence of the first control pulse 50. Further during the occurrence of the first control pulse 50, electronic switch 30 is adapted to permit signals to be applied only to its sum output connection. With no control signals applied to any of the phase shifters, signals from apertures A, B, C, and D are not shifted in phase, and their sum is applied to mixer 24. After the sum signal is converted to an intermediate frequency signal, it is applied through IF channel 28 and switch 30 to range detector and indicator 34 and delay lines 38, 40. Delay line 40 is adapted to delay the sum signal pulse to cause it to be applied to azimuth discriminator 36 at the time of the occurrence of the second control signal pulse 52 from gate pulse synchronizer 44.

During the occurrence of the second control pulse 52, pulsing and switch network 42 is adapted to apply a control signal to waveguide phase shifters 18 and 20. Phase shifters 18 and 20 respond to the control signal to shift the phase of the signals from apertures B and D 180° with respect to the signals from phase shifters 16 and 22. Phase shifters 16 and 22 effect no shift in phase of the signals from apertures A and C. Thus the signals applied to mixer 24 from phase shifters 16 and 22, being 180° out of phase with respect to the signals from phase shifters 18 and 20, will result in a signal at mixer 24 whose magnitude is representative of the angular deviation of the target to the right or left of the center of reflector 10. In response to control pulse 52, electronic switch 30 permits the intermediate frequency signal from IF channel 28 to be applied only to azimuth discriminator 36. The signal from delay line 40 provides a phase reference for that applied to azimuth discriminator 36. As is conventional, the output of azimuth discriminator 36 will be an azimuth error signal of one polarity where the signals from delay line 40 and switch 30 are in phase, but of opposite polarity if such signals are 180° out of phase with respect to each other. If the signals are in phase, the output signal from azimuth discriminator 36 may represent the condition where the target is to the left of the center of reflector 10, and scanning motor 14 will be operated to point the reflector 10 to the left. Similarly, if the sum and azimuth error signals are 180° out of phase, scanning motor 14 will be operated to point reflector 10 to the right.

During the occurrence of the third control pulse 54, pulsing and switch network 42 is adapted to apply a control signal to waveguide phase shifters 20 and 22. In the manner previously described, phase shifters 20 and 22 respond to the control signal from network 42 to shift the phase of the signals from apertures C and D so that the signals from phase shifters 20 and 22 are 180° out of phase with respect to the signals from phase shifters 16 and 18. This results in a signal being applied to mixer 24 whose magnitude represents the angular deviation of the target above or below the center of reflector 10. In response to the control pulse 54, electronic switch 30 permits the intermediate frequency signal from IF channel 28 to be applied only to elevation discriminator 32. Delay line 38 causes the previously developed sum signal to be applied to elevation discriminator 32 along with the output from switch 30. As in the case of azimuth discriminator 36, the sum signal provides a phase reference for the signals applied to elevation discriminator 32. The elevation error signals from elevation discriminator 32 will be of one polarity where the two applied signals are in phase, but of opposite polarity if the signals from switch 30 are 180° out of phase with respect to the sum signal. If the signals are in phase, the output signal from elevation discriminator 32 may represent the condition where the target is above the axis of reflector 10, and scanning motor 14 will be operated to point the reflector upwards. Similarly, if the sum and elevation signals are 180° out of phase, representing the condition where the target is below the axis, scanning motor 14 will be operated to point reflector 10 downwardly.

FIG. 3 illustrates one particular way for effecting the desired operation of the system above described. Referring to FIG. 3, the phase shifters are shown as an array of four rectangular waveguide sections 16′, 18′, 20′ and 22′, arranged to be coupled to the array of antenna apertures A, B, C, and D as indicated. Waveguides 18′, 20′, and 22′ contain respective ferrite elements 60, 62, and 64. Respective electromagnetic control coils 66, 68, and 70 are mechanically coupled in fixed space relation to waveguides 18′, 20′ and 22′. One end of each coil is grounded, and the other end of each coil is connected to pulsing and switch network 42.

Waveguides 18′, 20′, and 22′, as above described, are arranged as ferrite phase shifters in the manner described and claimed in a copending application of W. A. Hughes, entitled "Ferromagnetic Microwave Phase Shifter," Serial No. 459,094, filed September 29, 1954, now abandoned. Briefly, as described in such copending application, a ferrite phase shifter comprises a section of waveguide which contains a small segment of ferromagnetic material. An external electromagnetic control circuit adjacent to the ferrite element receives a D.-C. signal of a predetermined polarity to cause signals propagated by the waveguide to be reversed in phase, due to the properties of the ferrite material. Thus, by applying a pulse of D.-C. current to coils 66 and 68 during the occurrence of the second control pulse 52 (FIG. 2) from gate pulse synchronizer 44, the signals from waveguides 18′ and 20′ will be 180° out of phase with respect to the signals from waveguides 16′ and 22′. The outputs from all the waveguides are applied to a waveguide mixer 24′, from which a resultant signal is applied through a conventional TR box 70 to an electronic mixer 24″. The magnitude of the resultant signal from waveguide mixer 24′, and hence the intermediate frequency signal from electronic mixer 24″, represents the angular deviation of a target to the right or left of the axis of reflector 10 of FIG. 1.

In a similar manner, a pulse of D.-C. current is applied to coils 68 and 70 during the occurrence of the third control pulse 54 to cause the signals in waveguides 20′ and 22′ to be reversed 180° in phase with respect to the signals in waveguides 16′ and 18′. The magnitude of the resultant signal from waveguide mixer 24′, and that of the intermediate frequency signal from electronic mixer 24″, represent the angular deviation of the target above or below the axis of the reflector.

For purposes of explanation, the received echo pulses are indicated in FIG. 2a to be of 1.25 microseconds duration. Further, the control pulses 50, 52, and 54 are each of 0.25 microsecond duration, and successive control pulses are spaced 0.25 microsecond apart. Under these conditions, the respective intermediate frequency signals applied through IF channel 28 to electronic switch 30 are of 0.25 microsecond duration.

During the occurrence of the first control pulse 50, electronic switch 30 applies the intermediate frequency sum signal to a sum detector 34′, the output of which is coupled to a visual indicator 34″. The signal applied to sum detector 34′ is delayed 0.5 microsecond by a delay line 40′ and applied to azimuth discriminator 36 coincidentally with the azimuth intermediate frequency signal developed during the occurrence of control pulse 52. A 1.0 microsecond delay line 38' delays the sum signal so that it is applied to elevation discriminator 32 coincidentally with the elevation intermediate frequency signal developed during the occurrence of control pulse 54. Elevation and azimuth discriminators 32, 36 operate as previously described to supply control signals to the scanning motor.

As previously indicated, control pulses of equal spacing and duration have been illustrated and described to facilitate an understanding of the operation of the improved monopulse receiving system of this invention. It should be apparent that gate pulse synchronizer 44 could be adapted to develop control pulses of different widths and spacings, whereby a form of pulse coding would be accomplished. Furthermore, it is obvious that a single transmitted and received echo pulse need not have a total width equal to the combined widths of the control pulses and the spacing between them. For example, the transmitter 60 (FIG. 3) could be adapted to transmit successive pulses, during the successive echo pulses of which the respective sum, azimuth and elevation signals are developed; i.e., gate pulse synchronizer 44 could be adapted to control the operation of pulsing and switch network 42 and electronic switch 30 during one received echo pulse to permit sum signals to be developed, during the occurrence of a second received echo pulse to permit the azimuth error signals to be developed, and during the occurrence of the third received echo pulse to permit the elevation error signals to be developed. Furthermore, such transmitted and received echo pulses could be coded in a predetermined manner, as with varying widths and spacings, with gate pulse synchronizer 44 being operable in similarly coded fashion.

The system of the present invention has the advantage that there is no deterioration of signals due to phase and gain differences as caused by the use of three receiver channels in conventional monopulse receiving systems. Further, the system of the present invention lends itself readily to broad band applications. The only frequency sensitive devices in this system are the phase shifters, and where a ferrite phase shifter of the type illustrated here is employed, a broad band 180° phase shifter can be made by suitably shaping the external magnetic field across the ferrite element as taught in the aforementioned copending application for patent.

Conventional circuit arrangements may be employed to effect the switching as previously described. For example, circuit arrangements for electronic switch 30 and pulsing and switch network 42 may be used in accordance with the teaching in the publication, "Waveforms," M.I.T. Radiation Laboratory Series, vol. 19, Chapter 10, "Time Selection," pages 370–381 (McGraw-Hill Book Company, Inc., New York, N.Y., 1949).

What is claimed is:

1. A monopulse radar receiving system comprising a single receiver channel, scanning means including an array of waveguides to receive echo pulses reflected from a target, a waveguide phase shifting network, said waveguide phase shifting network being coupled between said array of waveguides and said receiver channel, said phase shifting network including means sequentially operative during the reception of said echo pulses to selectively shift the phase of echo pulse energy in selected portions of said array of waveguides to cause successive signals to be applied to said receiver channel which represent respective angular positions of the target in azimuth and in elevation, and signal detecting means, said signal detecting means being coupled to said receiver channel and operative sequentially and in synchronism with the operation of said phase shifting network to develop respective error signals which represent the total angular position of the target in azimuth and in elevation.

2. A monopulse radar receiving system comprising: an antenna scanner to receive echo pulses reflected from a target, said antenna scanner including an array of waveguides with apertures disposed about an axis and upon which the received echo pulses are impressed with respective intensities which depend upon the angular position of the target with respect to the axis; a waveguide phase shifting network, said phase shifting network being coupled to said array; an external control circuit coupled to said phase shifting network for applying control pulses sequentially to said phase shifting network, said phase shifting network being operative during a first control pulse to permit the energy from said array to pass through said phase shifting network without any shift in phase, said phase shifting network being operative during a second control pulse to shift the energy in first selected portions of said array 180° to develop output signals which represent the angular direction of the target in azimuth, said phase shifting network being operative during a third control pulse to shift the energy from second selected portions of said array 180° to develop output signals which represent the angular direction of the target in elevation; a converter coupled to said phase shifting network to convert the signals from said phase shifting network to signals of an intermediate frequency; first, second and third signal detectors; an electronic switch, said electronic switch being coupled between said converter and each of said detectors, said electronic switch being operative during said first, second and third control pulses to couple said converter respectively to said first, second and third detectors; said first, second and third detectors being operable to develop respective output signals representing the range and total angular position of the target in azimuth and in elevation.

3. A monopulse radar receiving system comprising movable antenna scanning means, said scanning means having an axis and being adapted to scan a predetermined region in which a target is located; an array of waveguides supported by said scanning means and having apertures disposed about said axis, said scanning means being adapted to receive echoes of transmitted pulses reflected from the target, said array of waveguides being adapted to propagate respective portions of the received energy impressed upon their respective apertures; respective matching waveguide phase shifters coupled to said waveguide array; a signal pulse control source coupled to each of said phase shifters, each of said phase shifters being operable upon receiving a pulse from said control source to effect a 180° phase shift of the energy from the associated waveguide of said array, said external control source being operative during a first portion of the received echo pulses to permit all of said phase shifters to propagate the received energy without any relative shift in phase, said control source being operative to apply a control pulse to a first number of said phase shifter during a second portion of the received echo pulses and to apply a control pulse to a second number of said phase shifters during a third portion of the received echo pulses, said phase shifters being operable during said first, second and third portions of the received echo pulses to develop respective output signals representing the range, azimuth angular direction and elevation angular direction of the target; an intermediate frequency converter coupled to all of said phase shifters; first, second and third signal detectors; an electronic switching network, said electronic switching network being coupled to said converter and to each of said detectors, said electronic switching network being operative during said first, second and third portions of the received echo pulses to couple said converter respectively to said first, second and third detectors, and said first, second and third detectors being operable during said first, second and third portions of said received echo pulses to develop respective output signals which represent the target's range, total angular position in azimuth and total angular position in elevation.

4. In a monopulse receiving system, in combination with an antenna scanner of the type including an array of waveguide apertures disposed about the geometric axis of an antenna reflector, wherein echo pulses reflected from a target within a predetermined region of scan about their axis are received at each aperture with an intensity corresponding to the angular position of the target with respect to the axis and such aperture; respective waveguide phase shifters coupled to said apertures; an external control signal source, each of said phase shifters being operable upon receiving a control signal from said source to shift the phase of the energy propagated from the associated aperture 180°, said source being adapted during a first portion of the received echo pulses to permit all of said phase shifters to propagate the energy from said apertures without any relative phase shift, said control source being adapted during second and third portions of the received echo pulses to apply control signals respectively to first and second combinations of said phase shifters, said phase shifters being operable during said second and third portions of said received echo pulses to effect total output signals which represent the angular direction of the target in elevation and in azimuth; signal converting means coupled to said phase shifters, said signal converting means being operative during said first, second and third portions of the received echo pulses to convert the total signals from said phase shifters to signals of a predetermined intermediate frequency; an electronic switching network, said switching network being coupled to said control signal source and to said signal converting means; and first, second and third signal detecting means coupled to said electronic switching means, said electronic switching means being operable during the first, second and third portions of said received echo pulses to apply the respective intermediate frequency signals to said first, second and third signal detecting means, and said first, second and third signal detecting means being operable to develop respective sum, azimuth and elevation error signals.

5. A monopulse radar receiving system comprising a single receiver channel; scanning means of the type including an array of waveguides having apertures to receive an echo pulse reflected from a target; a waveguide phase shifting network, said network including waveguide phase shifters respectively coupled to the wave guides of said array, the output of said phase shifting network being coupled to said receiver channel, said phase shifting network being sequentially operative during first, second and third portions of said echo pulse to selectively shift echo pulse energy in selected ones of said phase shifters 180° to develop total signals to be applied from the output of said phase shifting network to said receiver channel which represent the range and the respective angular directions of the target in azimuth and in elevation; and signal detecting means, said signal detecting means being coupled to said receiver channel and operable in synchronism with said phase shifting network to develop respective error signals which represent the range and the total angular positions of the target in azimuth and in elevation.

References Cited by the Examiner
UNITED STATES PATENTS

| | | | |
|---|---|---|---|
| 2,480,829 | 9/49 | Barrow | 343—7.4 |
| 2,594,317 | 4/52 | Lancor | 343—11 |
| 2,700,763 | 1/55 | Foin | 343—11 |

FOREIGN PATENTS

| | | |
|---|---|---|
| 102,039 | 7/41 | Sweden. |

CHESTER L. JUSTUS, *Primary Examiner.*

NORMAN H. EVANS, *Examiner.*